(12) United States Patent
Vinarov et al.

(10) Patent No.: US 6,939,688 B1
(45) Date of Patent: Sep. 6, 2005

(54) BIOLOGICAL ADDITION TO ORGANIC-MINERAL FERTILIZERS

(75) Inventors: Alexandr Vinarov, Moscow (RU);
Aleksei Sementsov, Kimry (RU);
Sergei Tishkin, Moscow (RU);
Tatiyana Ipatova, Moscow (RU);
Tatiyana Sidorenko, Moscow (RU);
Boris Burmistrov, Moscow (RU)

(73) Assignee: Soil Biogenics Ltd, Hamilton (BM)

( * ) Notice: Subject to any disclaimer, the term of this patent is extended or adjusted under 35 U.S.C. 154(b) by 0 days.

(21) Appl. No.: 10/111,383

(22) PCT Filed: Mar. 21, 2000

(86) PCT No.: PCT/RU00/00089

§ 371 (c)(1),
(2), (4) Date: Sep. 5, 2002

(87) PCT Pub. No.: WO01/32587

PCT Pub. Date: May 10, 2001

(30) Foreign Application Priority Data

Nov. 1, 1999 (RU) ................................ 99122635

(51) Int. Cl.$^7$ ........................ C12P 39/00; A01N 63/00; C05F 11/08
(52) U.S. Cl. ................................ 435/42; 71/7; 504/117
(58) Field of Search ............................ 71/7; 504/117; 435/42

(56) References Cited

U.S. PATENT DOCUMENTS

| 5,071,462 A | 12/1991 | Kimura | ........................... 71/7 |
| 6,228,806 B1 * | 5/2001 | Mehta | ........................ 504/117 |
| 6,318,023 B1 * | 11/2001 | Yamashita | .................. 504/117 |

FOREIGN PATENT DOCUMENTS

| EP | 0874790 B1 | 11/1998 |
| RU | 589238 | 1/1978 |
| RU | 935501 | 6/1982 |
| RU | 2055823 C1 | 3/1996 |
| RU | 2081866 C1 | 6/1997 |
| RU | 2108999 C1 | 4/1998 |
| WO | WO96/34840 | 11/1996 |

* cited by examiner

Primary Examiner—Herbert J. Lilling
(74) Attorney, Agent, or Firm—Jacobson Holman PLLC

(57) ABSTRACT

The biological addition to organic-mineral fertilizers contains two bacteria associations taken in the ratio 1–2:0.5–1, with one of the associations containing *Azotobacter chroococcum* and *Beijerinckia fluminensis* nitrogen binding bacteria in the ratio 1–0.5:1–0.5 and the other association containing *Bacillus megaterium* and *Bacillus mucilaginosis* bacteria, which decompose phosphorus- and potassium containing compounds, in the ratio 1–5:0.5–2, as well as a preservative and micro- and macroelements.

15 Claims, No Drawings

BIOLOGICAL ADDITION TO ORGANIC-MINERAL FERTILIZERS

CROSS REFERENCES TO RELATED APPLICATIONS

This is a nationalization of PCT/RU00/00089 filed Mar. 21, 2000 and published in English.

BACKGROUND OF THE INVENTION

1. Field of the Invention

The present invention relates to the field of biotechnology and agriculture, namely, to the production of organic-mineral fertilizers, and can be used in the production of those fertilizers.

2. Description of Related Art

Mixtures of organic and mineral fertilizers that are used in agricultural production are known. These consist of organic compounds, primarily, peat, brown coal, shale, humus and feces, treated with ammonium and/or phosphate ammonia solutions and/or phosphoric acid and/or potassium salts. The best known organic-mineral fertilizers are peat-ammonium and peat-mineral-ammonium ones.

The common disadvantage of the generally known organic-mineral fertilizers is the long time required for their effect to take place because the release of nutrients from those organic-mineral fertilizers is a long process that occurs, mainly, due to the association of microorganisms present in the soil treated with the mineral-organic fertilizers.

It was therefore suggested to use biological additives to the organic-mineral fertilizers that accelerate the release of nutrients from the fertilizers and the assimilation of the released substances by the plants. Moreover, these biological additives favor the accumulation of the nutrients in the soil in a form that can be easily assimilated by plants. Known (SU, Inventor's Certificate 589238 C 02 F11/08, 1978) is addition, to a mixture of peat, lime and mineral compounds preliminarily treated with water solutions of peat mineralizing activators, of a water suspension of bacterial cultures (host bacterial culture and azobacterine). The water suspension of bacterial cultures increases the efficiency of a fertilizer.

Also known (SU, Inventor's Certificate 935501 C 05 F11/08, 1982) is addition of a suspension of yeast and unicellular algae into an organic-mineral fertilizer.

Also known (RU, Patent 2055823 C 05 F 11/08, 1996) is addition, to a mixture of preliminarily fermented dung and peat, of bacteria consortium (*Streptococcus thermophilus, Streptococcus bovis, Dactobacillus salivaries* var *salicinicus, Lactobacillus salivaries* var *salicinicus and Lactobacillus acidophilus*).

Yet another known method (RU, Patent 2081866 C 05 F11/08, 1997) is addition to sapropel of a suspension of microorganisms in an amount of 0.001–0.3 wt. %. This suspension contains nitrogen binding (*Azotobacter chroococcum*), phosphate solving (*Bacillus mucilaginosus*) and lactic acid bacteria, the latter being in the form of a consortium containing *Streptococcus thermophilus, Streptococcus bovis, Lactobacillus salivaries* var *salicinicus, Lactobacillus salivaries* var *salivarus* and *Lactobacillus acidophilus*. Also, *Trichoderma viride* and *Beauveria bassiana* can be added.

The disadvantage of the known solutions is the insufficient activity of the biological additions due to their non-optimum composition.

SUMMARY OF THE INVENTION

The technical task solved by the present invention is the development of a biological additive the content of which favors the most effective assimilation of nutrients from the organic-mineral fertilizers.

The technical result provided by the present invention includes the increasing of the nutrition value of the organic-mineral fertilizers, the decreasing of the consumption of the organic-mineral fertilizers and the increasing of the yield of cultivated plants due to the additional accumulation of nitrogen-containing compounds in the soil and the transition of potassium-and phosphorus-containing fertilizers into forms that can be easily assimilated by plants.

The above technical result is achieved by using a biological additive that contains two bacteria associations taken in the ratio 1–2:0.5–1, a preservative and micro-and macroelements, and the former bacterial association containing *Azotobacter chroococcum* and *Beijerinckia fluminensis* nitrogen-binding bacteria in the ratio 1–0.5:1–0.5, and the latter bacterial association containing *Bacillus megaterium* bacteria that decomposes phosphorus-containing compounds and *Bacillus mucilaginosus* bacteria that decomposes potassium-containing compounds in the ratio 1–5:0.5–2. The bacterial associations are preferably obtained by periodic deep cultivation, semi-continuous deep cultivation or continuous deep cultivation, as well as by surface cultivation. The cultivation is usually accomplished on preliminarily selected media, and joint cultivation is made on a combined nutrient medium. Preferably, the cultivation is performed at pH 5.0–8.0 in the presence of macro-and microelements and a source of carbon and preservatives at 26–34° C. with air aeration at a rate of 0.1–2.0 vol/vol min. Basically, the preservatives are polysaccharides and the microelements are magnesium, iron (II), manganese, zinc, molybdenum, boron and cobalt ions in amounts of $10^{-4}$–$10^{-6}$ wt. %. The biological additive is a water suspension of active bacteria cells, or dry powder that contains active bacteria cells, or a solid nutrient medium that contains active bacteria cells. In any case the biological additive preferably contains active cells in an amount of $10^3$–$10^9$ per 1 kg of fertilizer. The biological additive basically contains *Azotobacter chroococcum* GSB-TB 4B, *Beijernckia fluminensis* GSB-TB 5B, *Bacillus megaterium* GSB-TB 3B and *Bacillus mucilaginosus* GSB-TB 6B bacteria strains from the collection of the State Research Institute for Protein Biosynthesis. The biological materials containing *Azotobacter chroococcum* GSB-TB 4B, *Beijernckia fluminensis* GSB-TB 5B, *Bacillus megaterium* GSB-TB 3B and *Bacillus mucilaginosus* GSB-TB 6B bacteria strains were deposited with Russian National Collection of Industrial Microorganisms (VKPM) Depository, the recognized IDA under the Budapest Treaty, on Apr. 25, 2002. The accession number for *Beijernckia fluminensis* GSB-TB 5B is VKPM B-8276. The accession number for *Azotobacter chroococcum* GSB-TB 4B is VKPM B-8275. The accession number for *Bacillus mucilaginosus* GSB-TB 6B is VKPM B-8280. The accession number for *Bacillus megaterium* GSB-TB 3B is VKPM B-8279. However, other microbial strains can also be used.

DETAILED DESCRIPTION OF THE INVENTION

The invention can be implemented using the following methods.

1. *Azotobacter chroococcum* GSB-TB 4B and *Beijerinckia fluminensis* GSB-TB 5B bacteria association taken in the ratio 1:1 is cultivated in 750 ml flasks on a rocker at a revolution speed of 300 rpm, which corresponds to an air mass exchange of 0.1 vol/vol min, at 30° C. on a medium that contains, wt. %, 2.0 molasses, 0.05 monopotassium phosphate, 0.01 sodium chloride, 0.005 magnesium sulfate, 0.5 calcium carbonate, iron (II), manganese and zinc sulfates $5 \cdot 10^{-4}$ each, molybdenum and cobalt sulfates $5 \cdot 10^{-5}$ each and 0.5 agar at pH 7.0 during 72 h. Bacillus megaterium GSB-TB 3B and Bacillus mucilaginosus GSB-TB 6B taken in the ratio 2:1 is cultivated for 24 h in a fermenter with mechanical stirring at n=1400 rpm and t=28–29° C. with an air supply of 1.0 vol/vol min on a medium that contains, wt. %, 1.0 molasses, 1.0 popcorn extraction, 0.05 ammonium sulfate, 0.01 potassium chloride, 0.005 magnesium sulfate, 0.3 calcium carbonate and 0.075 sodium and potassium tartrate, at pH 5.0. Two volume fractions of the former association are mixed with one volume fraction of the latter association to obtain a biological additive that contains a bacterial consortium of $1 \cdot 10^{10}$ cells/kg, agar in an amount of 0.4 wt. %, magnesium, iron (II), manganese and zinc ions in an amount of $1 \cdot 10-4$ wt. % each and molybdenum, boron and cobalt ions in an amount of $3 \cdot 10-5$ wt. % each. The biological additive is sprayed onto a mixture of peat and fermented poultry dung in an amount of $10^9$ cells per 1 kg of the fertilizer. The resultant complex fertilizer was introduced into the soil of a test area in an amount of 1 kg/m². The initial nitrogen, phosphorus and potassium contents in the soil were 8.0, 2.0 and 3.0 g/m, respectively. The soil was regularly wetted and weeded over two summer months, and after that the nitrogen, phosphorus and potassium contents in it were measured again. Their new values were 15.0, 6.0 and 9.0g/m², respectively. The reference area was fertilized with the same amount of peat mixed with fermented poultry dung. The final concentrations of nitrogen, phosphorus and potassium in the reference area that was also regularly wetted and weeded were 4.2, 1.1 and 2.4 g/m², respectively. The effect of the combined fertilizer was tested for cauliflower. Introduction of the combined fertilizer in a concentration of 1 kg/m² provided a cauliflower yield of 2.55 kg/m², while in the reference area fertilized with the same organic-mineral compound without the biological addition the cauliflower yield under the same conditions was 1.7 kg/m².

Thus, the yield increasing effect was about 50%.

2. A bacteria consortium consisting of *Azotobacter chroococcum* GSB-GB 4B and Beijerinckia fluminensis GSB-GB 5B bacteria associations in the ratio 1:2 and *Bacillus megaterium* GSB-GB-3B and *Bacillus mucilaginosus* GSB-GB 6B bacteria associations in the ratio 1:1, with the ratio of the associations in the consortium being 1:1, is cultivated for 18 h in a fermenter with stirring at 1500 rpm at 29–30° C. and air supply 0.5 vol/vol min on an medium containing, wt. %, 1.0 molasses, 0.01 yeast extraction, 0.03 potassium phosphate 0.02 ammonium sulfate, 0.002 sodium chloride, 0.0002 magnesium sulfate, 0.1 calcium carbonate, iron (II), manganese and zinc phosphates $1 \cdot 10-4$ each, molybdenum and cobalt ions $1 \cdot 10^{-6}$ each, 0.2 gelatin and 0.04 sodium nitrate at pH 6.0. After the 18 h processing 1/5 part of the suspension is discharged from the fermenter and replaced with the same amount of fresh nutrient medium of the composition described above. The water suspension of bacteria association obtained in this procedure is thickened on a centrifuge, then dried on a dryer and mixed with 1% of oleic acid. The resultant biological additive is added to rotten cow manure and sawdust in an amount of $10^6$ cells per 1 kilogram of the mixture. This fertilizer was introduced into the soil of the test area in an amount of 2 kg/m². The nitrogen, phosphorus and potassium contents in the soil were 7.0, 0.8 and 1.1 g/m², respectively. The soil was regularly wetted and weeded during two summer months. As a result, the nitrogen, phosphorus and potassium contents in the soil by autumn became 17.0, 5.6 and 7.3 g/m², respectively. In the reference area under similar conditions the same amount of mixture of dry rotten cow manure with sawdust without the biological additive was introduced. The final nitrogen, phosphorus and potassium contents in the soil of the reference area were 2.2, 0.4 and 0.7 g/m², respectively. The effect of the complex fertilizer was tested for potatoes. Introduction of the fertilizer with the biological additive into the soil in an amount of 2 kg/m² gave a potato yield of 10.8 kg/m². In the reference area obtaining of the same yield required 6 kg of dry rotten cow manure mixed with sawdust be introduced. Thus, the fertilizer saving was 200%.

3. *Azotobacter chroococcum* GSP-TB 4B and *Beijerinckia fluminensis* GSP-GB 5B bacteria association in the ratio 2:1 is cultivated using the surface method in flat flasks at 30° C. on a medium containing, wt. %, 2.0 sugar, 0.05 potassium phosphate, 0.1 yeast extraction, 0.5 calcium carbonate, iron (II), manganese and zinc sulfates $5 \cdot 10-4$ each and 0.5 agar at pH 7.0 for 24 h. *Bacillus megaterium* GSP-TB 3B and *Bacillus mucilaginosus* GSP-TB 6B bacteria association in the ratio 2:1 is cultivated for 16 h in a fermented at 28–29° C. and an air supply of 1.0 vol/vol min on a medium containing, wt. %, 1.0 molasses, 1.0 popcorn extraction, 0.05 ammonium sulfate, 0.01 potassium chloride, 0.005 magnesium sulfate, 0.3 calcium carbonate, and potassium and sodium tartrates 0.075 each at pH 5.0. Two volume parts of the former association are mixed with one volume part of the latter association to obtain a biological additive containing a bacteria consortium in an amount of $10^3$ cells/g and, wt. % 0.4 agar, iron (II), manganese and zinc ions $10^{-4}$ each, and molybdenum and cobalt ions $3 \cdot 10-5$ each. The biological additive is mixed with peat and non-rotten cow manure in an amount of $10^3$ cells per 1 kilogram of mixture. A sample of this mixture with the biological additive was held for two winter months at room temperature with wetting. In spring the sample of the complex fertilizer was introduced into the soil at the test area in an amount of 1 kg/m². The nitrogen, phosphorus and potassium contents in the soil were 22.0, 14.0 and 16.0 g/m². The effect of the fertilizer was tested for cabbage. Introduction of the fertilizer in an amount of 1 kg/m² gave a cabbage yield of 22.5 kg/m². At the reference area where the same amount of fertilizer without the biological addition was introduced, the cabbage yield was 12.5 kg. The effect of the biological addition for cabbage was therefore 80%.

4. *Azotobacter chroococcum* GSP-TB 4B and *Beijerinckia fluminensis* GSP-TB 5B bacteria associations in the ratio 2:1 are cultivated using the surface method in flat flasks at 30° C. on an medium containing, wt. %, 2.0 sugar, 0.05 potassium phosphate, 0.1 yeast extraction, 0.5 calcium carbonate, iron (II), manganese and zinc sulfates $5 \cdot 10-4$ each, molybdenum and cobalt ions $5 \cdot 10-5$ each and 2.0 agar at pH 7.0 for 120 h. *Bacillus megaterium* GSB-BT 3B and *bacillus Mucilaginosus* GSB-GB 6B bacteria association in the ratio 1:2 is cultivated using the surface method in flat flasks at 30° C. on a medium containing a mixture of beef-extract and wash agars in the ratio 1:1 at pH 7.0 for 120 h. One volume part of the former association is mixed with one volume part of the latter association to obtain an additive containing a bacteria consortium in an amount of $10^{15}$ cells/kg, 1.8 wt. % agar, magnesium, iron, manganese and zinc ions $4 \cdot 10^{-4}$ wt. % each, and molybdenum and cobalt ions $3 \cdot 10-5$ wt. % each. The resultant biological additive is introduced in an amount of $10^7$ cells/kg onto a mixture of poultry dung compost and superphosphate. The complex fertilizer produced was introduced into the soil at the test area in an amount of 1 kg/m$^2$. The initial nitrogen, phosphorus and potassium contents in the soil were 8.0, 2.0 and 3.0 g/m$^2$. The soil was wetted and weeded for two summer months. The final phosphorus, nitrogen and potassium contents were 15.0, 6.0 and 9.0 g/m$^2$. The reference area was fertilized with the same amount of dung-peat compost and superphosphate without the biological additive. After processing under similar conditions the phosphorus, nitrogen and potassium contents in the reference area soil were 4.2, 1.1 and 2.4 g/m$^2$. The effect of the fertilizer was tested for cauliflower. Introduction of 1 kg/m$^2$ of the complex fertilizer into the soil gave a cauliflower yield of 2.5 kg/m$^2$. At the reference area obtaining of the same yield required 3.5 kg/m$^2$ of dung-peat compost and superphosphate mixture without the biological addition. Thus, the fertilizer saving was 250%.

Along with fertilizer saving and increasing the yield, the use of the new biological additive reduces the number of ballast necessary, thus improving the soil structure.

What is claimed is:

1. A biological additive to organic-mineral fertilizers wherein it contains two bacteria associations in the ratio of 1–2:0.5–1, a preservative and micro-and macroelements, and the former bacterial association containing *Azotobacter chroococcum* and *Beijerinckia fluminensis* nitrogen binding bacteria in the ratio of 0.5:1–0.5, and the latter bacterial association containing *Bacillus megaterium* bacteria that decomposes phosphorus-containing compounds and *Bacillus mucilaginosus* bacteria that decomposes potassium-containing compounds in the ratio of 1–5:0.5–2.

2. The biological additive according to claim 1, wherein the bacteria associations are preliminarily obtained by deep cultivation method.

3. The biological additive according to claim 1, wherein the bacteria associations are preliminarily obtained by semi-continuous deep cultivation method.

4. The biological additive according to claim 1, wherein the bacteria associations are preliminarily obtained by continuous deep cultivation method.

5. The biological additive according to claim 1, wherein the bacteria associations are preliminarily obtained by surface cultivation method.

6. The biological additive according to claim 2, wherein the cultivation is performed on nutrient mediums preliminarily selected for each of the bacteria associations.

7. The biological additive according to claim 2, wherein the bacteria associations are cultivated jointly on a complex nutrient medium.

8. The biological additive according to claim 2, wherein the cultivation is performed at pH 5.0–8.0 in the presence of macro- and microelements, a source of carbon and preservatives.

9. The biological additive according to claim 8, wherein the cultivation is performed at 26–34° C.

10. The biological additive according to claim 2, wherein the cultivation is performed with an aeration level of 0.1 to 2.0 vol/vol min.

11. The biological additive according to claim 1, wherein the preservatives are polysacchrides and the microelements are magnesium, iron (II), manganese, zinc, molybdenum, boron and cobalt ions in amounts of $10^{-4}$ to $10^{-6}$ wt. %.

12. The biological additive according to claim 1, wherein it is in the form of a water suspension of active bacteria cells.

13. The biological additive according to claim 1, wherein it is in the form of dry power that contains active bacteria cells.

14. The biological additive according to claim 1, wherein it is in the form of a solid nutrient medium that contains active bacteria cells.

15. The biological additive according to claim 12, wherein it contains active cells in an amount of $10^3$ to $10^9$ cells per 1 kilogram of the fertilizer.

* * * * *